(12) United States Patent
Dharmapurikar (10) Patent No.: US 9,032,467 B2
(45) Date of Patent: May 12, 2015

(54) METHOD AND MECHANISM FOR EFFICIENTLY DELIVERING VISUAL DATA ACROSS A NETWORK

(75) Inventor: Makarand Dharmapurikar, Fremont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/558,163

(22) Filed: Jul. 25, 2012

(65) Prior Publication Data

US 2013/0198794 A1  Aug. 1, 2013

Related U.S. Application Data

(60) Provisional application No. 61/514,427, filed on Aug. 2, 2011.

(51) Int. Cl.
| | |
|---|---|
| *H04N 7/173* | (2011.01) |
| *H04N 7/12* | (2006.01) |
| *H04N 11/02* | (2006.01) |
| *H04N 11/04* | (2006.01) |
| *G06K 9/00* | (2006.01) |
| *H04N 21/81* | (2011.01) |
| *G06T 7/00* | (2006.01) |
| *H04N 21/2365* | (2011.01) |
| *H04N 21/238* | (2011.01) |
| *H04N 21/442* | (2011.01) |

(Continued)

(52) U.S. Cl.
CPC .......... *H04N 21/8153* (2013.01); *G06T 7/0051* (2013.01); *G06T 7/0079* (2013.01); *H04N 21/23655* (2013.01); *H04N 21/238* (2013.01); *H04N 21/44209* (2013.01); *H04L 47/2416* (2013.01); *H04L 67/322* (2013.01)

(58) Field of Classification Search
CPC ................ H04N 21/8153; H04N 21/23655; H04N 21/238; H04N 21/44209; G06T 7/0051; G06T 7/0079
USPC ................ 375/240.08–240.17; 382/106, 104
See application file for complete search history.

(56) References Cited

U.S. PATENT DOCUMENTS

| | | |
|---|---|---|
| 5,675,773 A | 10/1997 | Devic |
| 5,905,507 A | 5/1999 | Rossignac et al. |
| 5,926,182 A | 7/1999 | Menon et al. |

(Continued)

FOREIGN PATENT DOCUMENTS

| | | |
|---|---|---|
| EP | 0924933 A1 | 6/1999 |
| WO | 2004004359 A1 | 1/2004 |

(Continued)

OTHER PUBLICATIONS

International Search Report and Written Opinion for corresponding application PCT/US2012/048180, dated Oct. 16, 2012.

(Continued)

*Primary Examiner* — Benjamin R Bruckart
*Assistant Examiner* — Akshay Doshi (57) ABSTRACT

Disclosed is an approach for delivering visual content that improves network bandwidth utilizations. The visual data is separated into multiple categories, where the data for different categories are delivered using different bandwidth utilizations schemes. A first category of the data is delivered at a higher frame rate than the frame rate for a second category of the data.

18 Claims, 9 Drawing Sheets

(51) Int. Cl.
 *H04L 12/853* (2013.01)
 *H04L 29/08* (2006.01)

(56) References Cited

U.S. PATENT DOCUMENTS

| | | | |
|---|---|---|---|
| 5,990,972 A * | 11/1999 | Bond-Harris et al. | 348/563 |
| 6,115,038 A | 9/2000 | Christofferson et al. | |
| 6,160,557 A | 12/2000 | Narayanaswami | |
| 6,192,154 B1 | 2/2001 | Rajagopalan et al. | |
| 6,252,905 B1 | 6/2001 | Pokrinchak et al. | |
| 6,414,678 B1 * | 7/2002 | Goddard et al. | 345/419 |
| 7,095,444 B1 * | 8/2006 | Lincoln et al. | 348/390.1 |
| 7,274,368 B1 | 9/2007 | Keslin | |
| 7,295,612 B2 | 11/2007 | Haskell et al. | |
| 7,418,606 B2 | 8/2008 | Holmer | |
| 7,783,094 B2 | 8/2010 | Collins | |
| 7,856,059 B2 | 12/2010 | Haskell et al. | |
| 8,035,636 B1 | 10/2011 | Yang | |
| 8,319,781 B2 | 11/2012 | Westerhoff et al. | |
| 8,325,807 B2 | 12/2012 | Nilsson et al. | |
| 8,386,560 B2 | 2/2013 | Ma et al. | |
| 2001/0031003 A1 * | 10/2001 | Sawhney et al. | 375/240.14 |
| 2003/0197785 A1 * | 10/2003 | White et al. | 348/207.99 |
| 2003/0218615 A1 | 11/2003 | Gelb | |
| 2003/0235341 A1 * | 12/2003 | Gokturk et al. | 382/243 |
| 2004/0032906 A1 * | 2/2004 | Lillig | 375/240.08 |
| 2004/0041810 A1 | 3/2004 | Peacock et al. | |
| 2004/0078805 A1 * | 4/2004 | Brian et al. | 725/1 |
| 2004/0100466 A1 | 5/2004 | Deering | |
| 2004/0221004 A1 | 11/2004 | Chalfin et al. | |
| 2005/0237987 A1 * | 10/2005 | Wang et al. | 370/342 |
| 2006/0013495 A1 * | 1/2006 | Duan et al. | 382/235 |
| 2006/0045367 A1 | 3/2006 | Chao | |
| 2006/0082583 A1 | 4/2006 | Leichtling et al. | |
| 2006/0125848 A1 | 6/2006 | Alcorn et al. | |
| 2006/0159166 A1 | 7/2006 | Mohsenian | |
| 2007/0024705 A1 | 2/2007 | Richter et al. | |
| 2007/0046966 A1 | 3/2007 | Mussack et al. | |
| 2007/0115282 A1 | 5/2007 | Turner et al. | |
| 2007/0280290 A1 | 12/2007 | Hindus et al. | |
| 2008/0130989 A1 | 6/2008 | Moriya et al. | |
| 2008/0205518 A1 * | 8/2008 | Wilinski et al. | 375/240.08 |
| 2008/0225048 A1 | 9/2008 | Bijankumar et al. | |
| 2008/0316218 A1 | 12/2008 | Kilani et al. | |
| 2009/0033737 A1 | 2/2009 | Goose et al. | |
| 2009/0119736 A1 | 5/2009 | Perlman et al. | |
| 2009/0144775 A1 | 6/2009 | Rosin et al. | |
| 2009/0195537 A1 | 8/2009 | Qiu et al. | |
| 2009/0210487 A1 | 8/2009 | Westerhoff et al. | |
| 2010/0011301 A1 | 1/2010 | Binyamin | |
| 2010/0205246 A1 | 8/2010 | Collins | |
| 2010/0262710 A1 | 10/2010 | Khatib et al. | |
| 2010/0303148 A1 | 12/2010 | Hiron et al. | |
| 2011/0122063 A1 | 5/2011 | Perlman et al. | |
| 2011/0126255 A1 | 5/2011 | Perlman et al. | |
| 2012/0162412 A1 * | 6/2012 | Kim et al. | 348/135 |

FOREIGN PATENT DOCUMENTS

| | | |
|---|---|---|
| WO | 2004105393 A1 | 12/2004 |
| WO | 2006099082 A2 | 9/2006 |
| WO | 2007008355 A2 | 1/2007 |
| WO | 2009045683 A1 | 4/2009 |

OTHER PUBLICATIONS

International Search Report and Written Opinion dated May 8, 2012 for PCT/US2012/02117.

International Search Report and Written Opinion dated Aug. 10, 2012 for PCT/US2012/041521.

International Search Report and Written Opinion dated Feb. 2, 2012 for PCT/US2011/052010.

Non final Office Action dated Aug. 15, 2013 for U.S. Appl. No. 13/234,948, 21 pages.

Final Office Action dated Dec. 26, 2013 for U.S. Appl. No. 13/234,948, 25 pages.

* cited by examiner

METHOD AND MECHANISM FOR EFFICIENTLY DELIVERING VISUAL DATA ACROSS A NETWORK

CROSS-REFERENCE TO RELATED APPLICATIONS

The present application claims the benefit of U.S. Provisional Application 61/514,427, filed on Aug. 2, 2011, which is hereby incorporated by reference in its entirety.

BACKGROUND

There are many modern computing applications that require visual data to be sent from a server to a client computer. In fact, many server-based computing applications are premised on the notion that information to be displayed on the screen of a client computer will be generated at the server and sent to the client. A non-limiting list of such server-based applications includes virtualization systems, networked gaming platforms, and remote desktop systems.

Consider the typical interactive multi-user game applications, in which the users' computing systems are connected by a network to a centralized game program on a remote server. The user interacts with the game program by providing inputs from the user's local computer system. However, the visual contents that are seen by the user are instituted by the operations of the remote game program on the server, which are then locally displayed to the user on the user's local display device.

The issue is that there is potentially a tremendous amount of data that must be sent from the server to the client to allow these modern server-based applications to effectively display visual content to the user. For example, many interactive gaming applications have rapidly and constantly changing parts of screen, e.g., because of game characters that move around or because of game actions that result in changes to objects in the visual screen. As a result, if the game is a server-based game, there may be a need to have a continual stream of updates to the visual content that is displayed to the user. Such visual data that needs to be sent from the server to the client machine is often very large in terms of its transmission size.

If a large quantity of visual data must be sent to client machine, then a significant amount of network bandwidth will be needed send that data across the network. The problem is that there is a limited amount of bandwidth that is available for such applications. This bandwidth limitation is at several different levels of the network hierarchy. At the level of the service provider or server host, the bandwidth limitations are very real, since the provider must potentially service a large number of users, many of which are paying customers that will not tolerate interruptions because of a lack of bandwidth available to the service provider. At the level of the user, he/she may be limited in the amount of bandwidth that is available or that has been purchased for his/her service plan, and hence will not have an unlimited amount of bandwidth to receive visual content. However, with the growing competition that exists for these server-based services and application, users will not be tolerant of bad gameplay or a bad user experience as a result of slowed delivery of visual content.

As the number of users of server-based computing increases, and the amount of visual content is sent across the network increases, this problem will only increase over time. As a result, there is a need for an improved approach to increase the efficient utilization of the network bandwidth for display of visual content from server-based programs.

SUMMARY

Some embodiments of the present invention are directed to an improved approach for delivery visual content that improves network bandwidth utilization. The visual data is separated into multiple categories, where the data for different categories are delivered using different bandwidth utilizations schemes. In one embodiment, a first category of the data is delivered at a higher frame rate than the frame rate for a second category of the data.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

Some embodiments of the present invention are directed to an improved approach for delivery of visual content that improves network bandwidth utilization. The visual data is separated into multiple categories, where the data for different categories are delivered using different bandwidth utilizations schemes. In one embodiment, a first category of the data is delivered at a higher frame rate than the frame rate for a second category of the data.

The general premise is that the human eye is more sensitive to certain types of visual content. For example, the human eye tends to be more sensitive to objects that are in motion and tends to be less sensitive to objects that are more stationary. Similarly, the human eye tends to be more sensitive to objects that are closer or in the foreground and tends to be less sensitive to objects that are farther away or in the background. According to some embodiments of the invention, greater levels of network bandwidth will be devoted to video content that is more eye-sensitive (e.g., objects in motion and/or objects in the foreground), while lesser levels of network bandwidth are devoted to video content that is less eye-sensitive (e.g., stationary objects and/or objects in the background). This approach maintains the perceived quality level of the visual content that is delivered from the server, while also significantly decreasing the actual network delivery costs.

Figure 1:
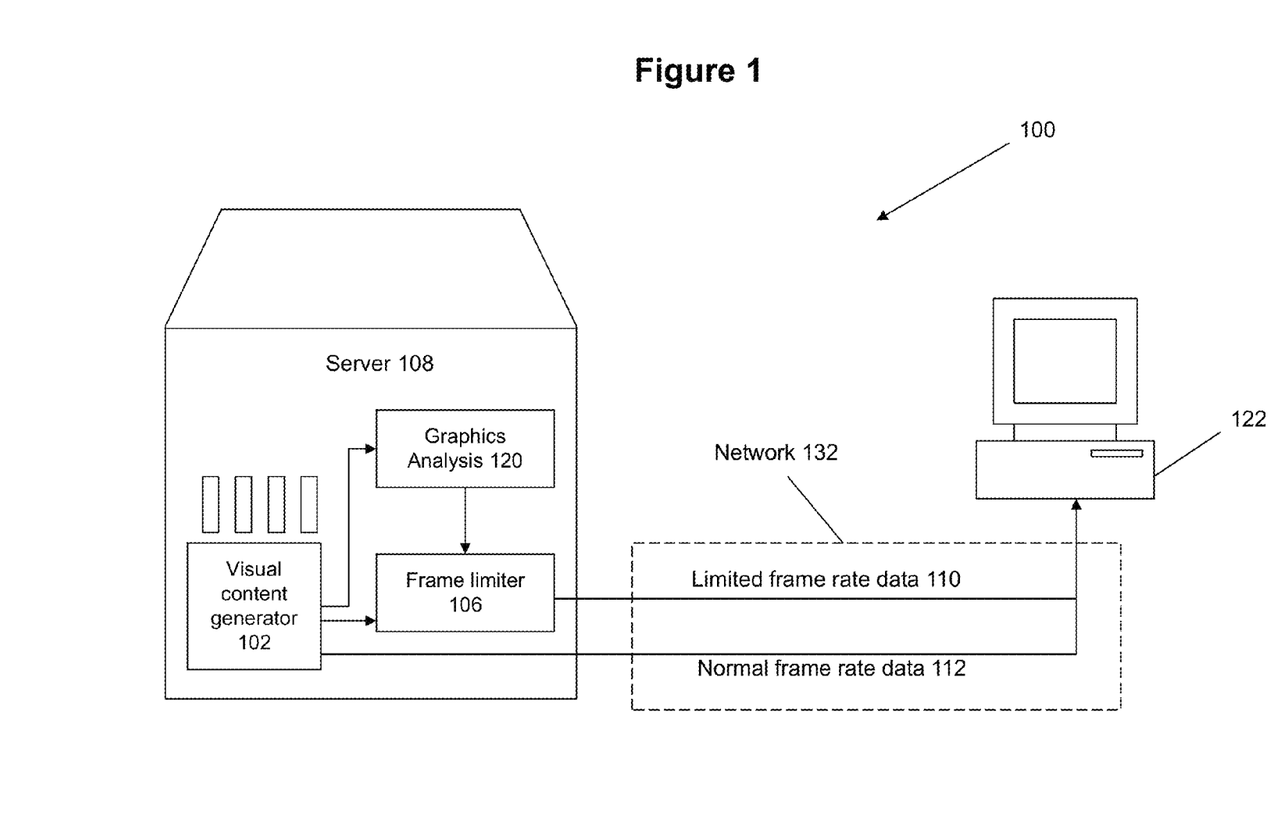
FIG. 1 illustrates an example architecture for more efficiently delivering visual content from a server according to some embodiments of the invention.

FIG. 1 illustrates an example architecture 100 which may be employed in some embodiments of the invention to deliver portions of visual content at different network bandwidth levels. Architecture 100 may include one or more users at one or more client station(s) 122 that operate or utilize a central program at a server 108. Such central programs include, for example, networked game programs. Client station 122 comprises any type of computing station that may be used to operate or interface with a central program at server 108. Examples of such client stations 122 include for example, workstations, personal computers, remote computing terminals, or dedicated gaming platforms.

The client station 122 comprises a display device, such as a display monitor, for displaying visual contents to users at the client station 122. Client station 122 also comprises one or more input devices for the user to provide operational control over the activities of client station 122 and architecture 100, such as a mouse or keyboard to manipulate a pointing object in a graphical user interface. The client station 122 may comprise either/both a video decoder and a GPU (graphical processing unit). The video decoder can be used to display a stream of video data in any suitable video format. The GPU can be used to render graphics at the client station 122 based upon delivered graphics data.

The server 108 comprises a visual content generator 102 to generate visual content to be delivered at the user station 122. For example, the visual content generator 102 may be a server based program (such as a game program) that generates graphical data to be displayed at the display monitor of the user station 122. The visual content generator 102 may correspond to a CPU and a GPU at the server 108 that are employed to render the graphics for delivery to the user station 122. The server-based CPU would describe the visual content at an abstract level and the server-based GPU would render the content in a pixel form into video data, which is sent to the client station 122 so that a client-based video decoder processes the pixel data for display on the client's display device. The visual content generator 102 may also correspond the CPU at the server 108 that generates graphics data at an abstract level (e.g., using graphics commands with vector data rather than raster data), and the graphics data is sent to the client station 122, where a client-based GPU processes the graphics data to locally render the visual content in a pixel form, which is then immediately displayed on the client's display device.

A graphics analysis module 120 analyzes the visual content generated by the video content generator 102 to identify which of the video content should be delivered with higher bandwidth content and which should be delivered with lower bandwidth content. Any suitable approach can be taken to determine the set of data that should correspond to the higher and lower bandwidth categories. For example, video content that is more sensitive for the human eye may be categorized for high bandwidth delivery and video content that is less sensitive for the human eye may be categorized for low bandwidth delivery. While the current disclosure illustrates the invention with only two categories (high and low bandwidth), it is noted that the invention is not limited to only two categories, and indeed any number of bandwidth categories (or even individualized bandwidth settings for each object) may be employed.

Any suitable approach can be taken to implement different bandwidth utilizations for the different categories of the video content. For example, frame rate throttling may be employed in some embodiments to implement the different bandwidth delivery categories. In this approach, the video content that corresponds to a higher bandwidth is delivered across network 132 with as normal frame rate data 112. A frame limiter 106 is employed to deliver more limited frame rate data 110 across network 132 for video content that corresponds to a lower bandwidth. The frame rate limiter 106 operates by dropping every nth frame of the video content for the low bandwidth data.

According to some embodiments of the invention, the graphics analysis module 120 can operate to mix and match the objects within the same frame to be in different bandwidth categories. Therefore, the same frame may include some objects that correspond to a higher frame rate than other objects. For example, it is likely that the human eye will be less sensitive to objects in the background of the frame, but are more sensitive to objects in the foreground of the frame. As such, one possible approach to implement embodiments of the invention is to place objects in the frame foreground in the category to use more network bandwidth with a higher frame rate while objects in the frame background correspond to the category that uses less network bandwidth with a lower frame rate.

Figure 2:
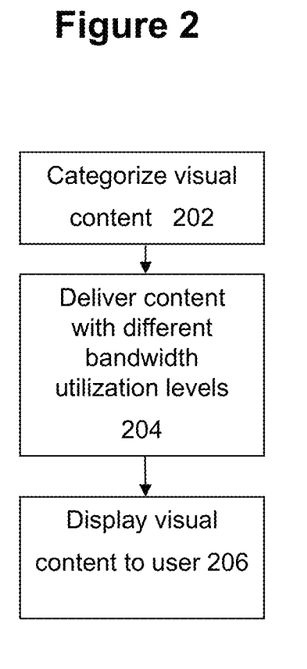
FIG. 2 illustrates a high-level flowchart of an approach for more efficiently delivering visual content from a server according to some embodiments of the invention.

FIG. 2 shows a high level flowchart of an approach for implementing some embodiments of the invention. At 202, the visual content is categorized into two or more categories, where the different categories correspond to different network bandwidth utilization expectations. One way to implement this categorization is to place more eye-sensitive content into the higher bandwidth category and to place less eye-sensitive content into the lower bandwidth category.

At 204, the different categories of the visual content are delivered with different network bandwidth utilization levels. A first category of visual content will be delivered with higher bandwidth delivery techniques and a second category of visual content will be delivered with lower bandwidth delivery techniques.

At 206, the delivered visual content is displayed to the user using a display device at the user station. As described in more detail below, the visual content that is delivered with a lower bandwidth utilization technique may need additional processing to allow it to be displayed correctly to the user.

Figure 3:
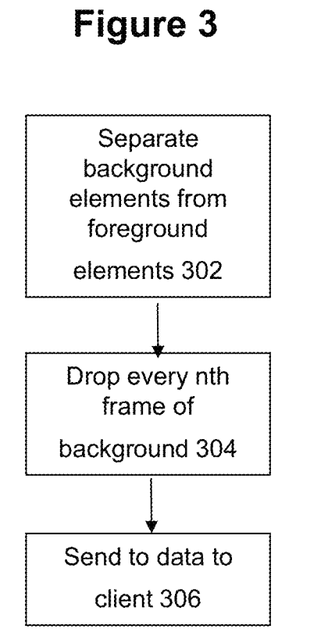
FIG. 3 illustrates a more detailed flowchart of an approach for more efficiently delivering visual content from a server according to some embodiments of the invention.

FIG. 3 shows a more detailed flowchart of an approach to implement some embodiments of the invention. At 302, the visual content is categorized into two or more categories based at least in part on whether the content relates to a foreground object or a background object. Foreground content is considered to be more eye-sensitive, and hence is placed into the higher bandwidth category. In contrast, background content is considered to be less eye-sensitive, and is therefore placed into the lower bandwidth category.

The different categories of the visual content are delivered with different network bandwidth utilization levels using frame rate throttling. Therefore, at 304, every nth frame of the data corresponding to the low bandwidth category will be dropped.

Thereafter, at 306, the visual content data will be delivered to the user station. A full frame rate will be used to deliver the foreground image objects for a frame. However, a reduced frame rate will be used to deliver the background image objects for the frame.

Figure 4:
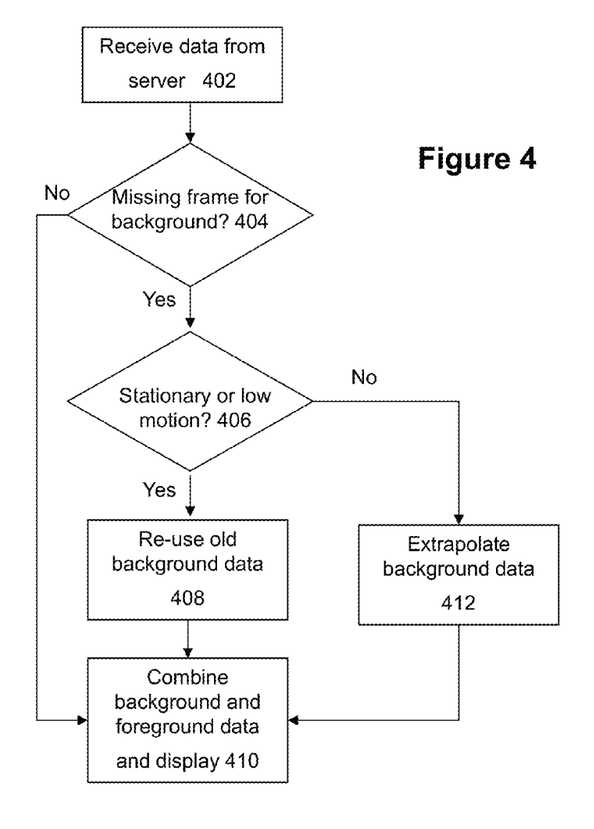
FIG. 4 illustrates a flowchart of an approach for handling visual content sent from a server according to some embodiments of the invention.

FIG. 4 shows a flowchart of an approach at the user station to process data from the server that corresponds to a lower frame rate. At 402, the visual content data is received from the server. A check is made at 404 whether an image object was delivered with a lowered frame rate. If so, then there is a missing graphics frame for that object, e.g., a background image object.

The missing graphics frame can be handled using any suitable approach. In some embodiments, a determination is made at 406 whether the image object relating to the missing graphics frame is a stationary or low motion object. If so, then previously cached data for that graphics frame can be re-used at 408 to display that image object. The assumption is re-using this cached data for a stationary or low motion object will not affect the visual perception by the user of the image frame in any appreciable or negative way.

However, if the image object relating to the missing graphics frame is not a stationary or low motion object, then there may be an obvious and/or perceptible visual problem for user if the previously cached frame data for that object is simply re-used. Therefore, at 412, the previously cached frame data is analyzed to extrapolate the expected new graphics frame for that image object due to the motion of that object. This is accomplished by reviewing two or more of the previous frames, and approximating a motion vector for that object. The motion vector can then be used to extrapolate the positioning of the object in the new frame.

At 410, the frame data for the foreground objects is combined with the frame data for the background objects to produce the visual display for the user. The foreground data would be entirely sent from the server. The background data may be sent from the server for every nth frame, but the other frames are either pulled directly from the cache or are extrapolated from the cached frames.

Figure 5:
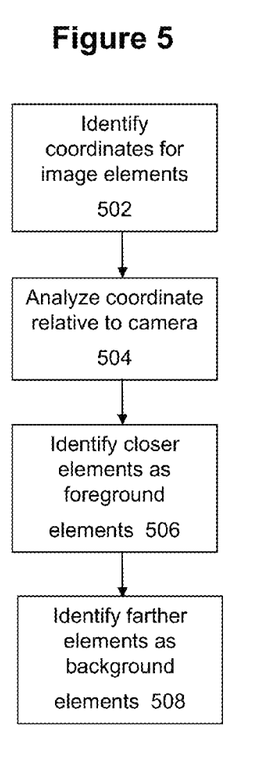
FIG. 5 illustrates a flowchart of an approach for categorizing data between foreground data and background data according to some embodiments of the invention.

FIG. 5 shows a flowchart of an approach for determining whether an image element is a foreground object or a background object. At 502, the coordinates are identified for the image elements in the frame. At 504, the coordinates of the image elements are analyzed relative to the "camera" point of view. This is essentially the point of view that is used to generate the display of the visual content.

The relative depths of the objects in the frame can then be determined from the camera's point of view. At 506, objects that are in front (having a closer depth to the camera position) are categorized as the foreground objects. At 508, objects that are in back (having a greater depth relative to the camera) are categorized as the background elements.

Figure 6A:
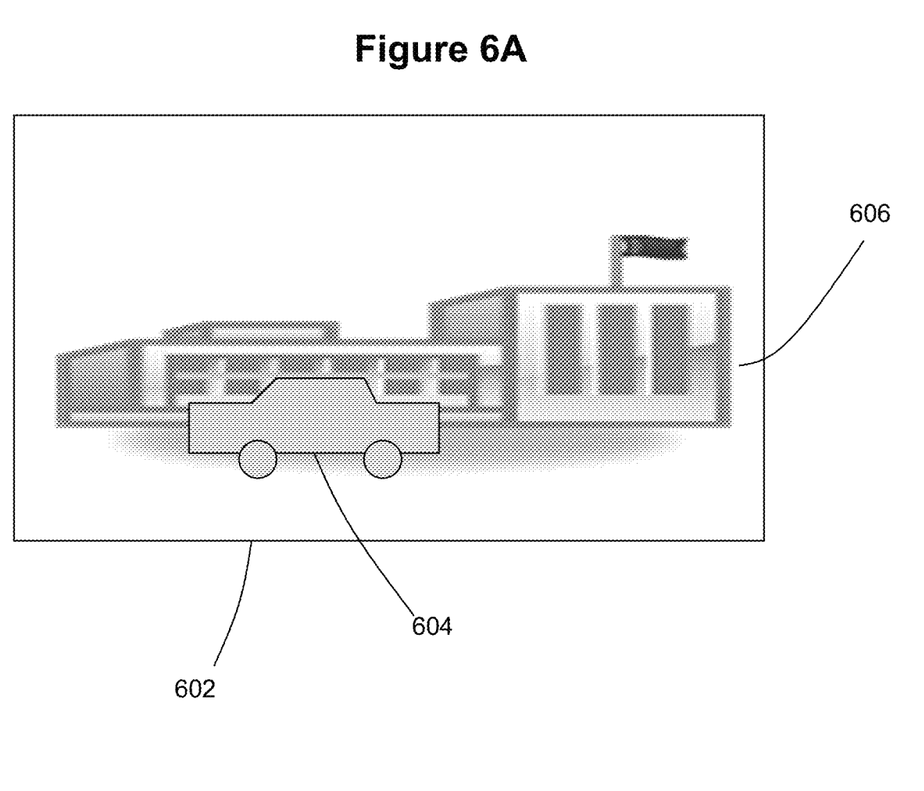
FIGS. 6A-C provides an illustrative example of an embodiment of the invention that is applied to efficiently deliver visual content from a server.
Figure 6B:
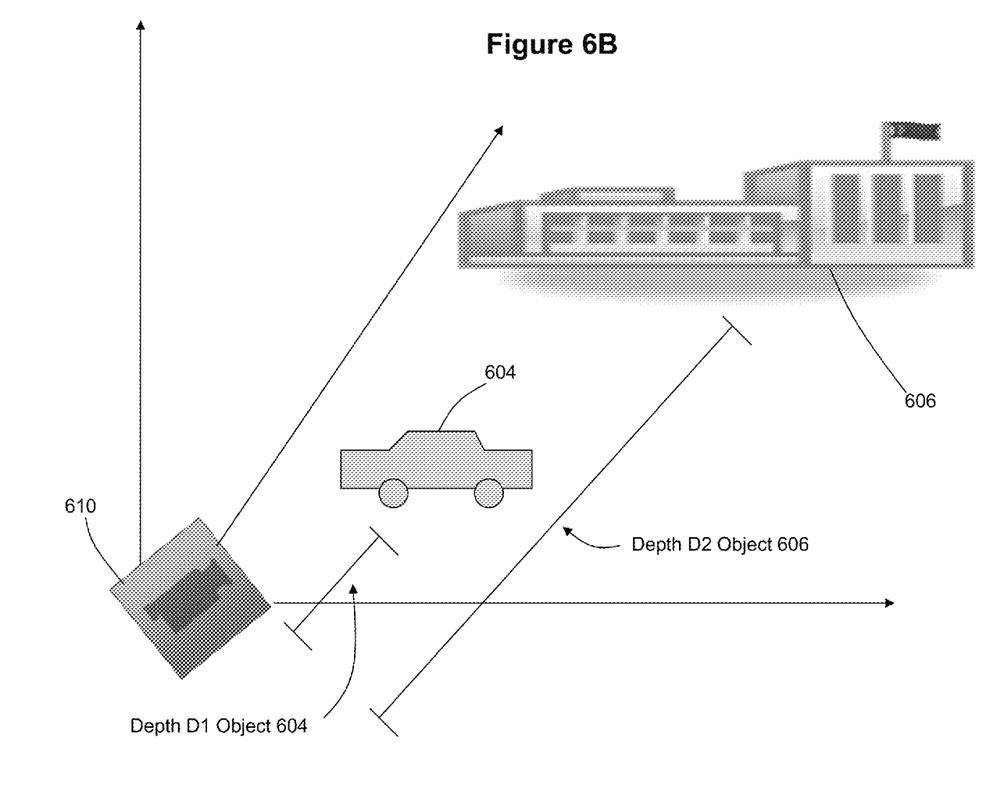
Figure 6C:
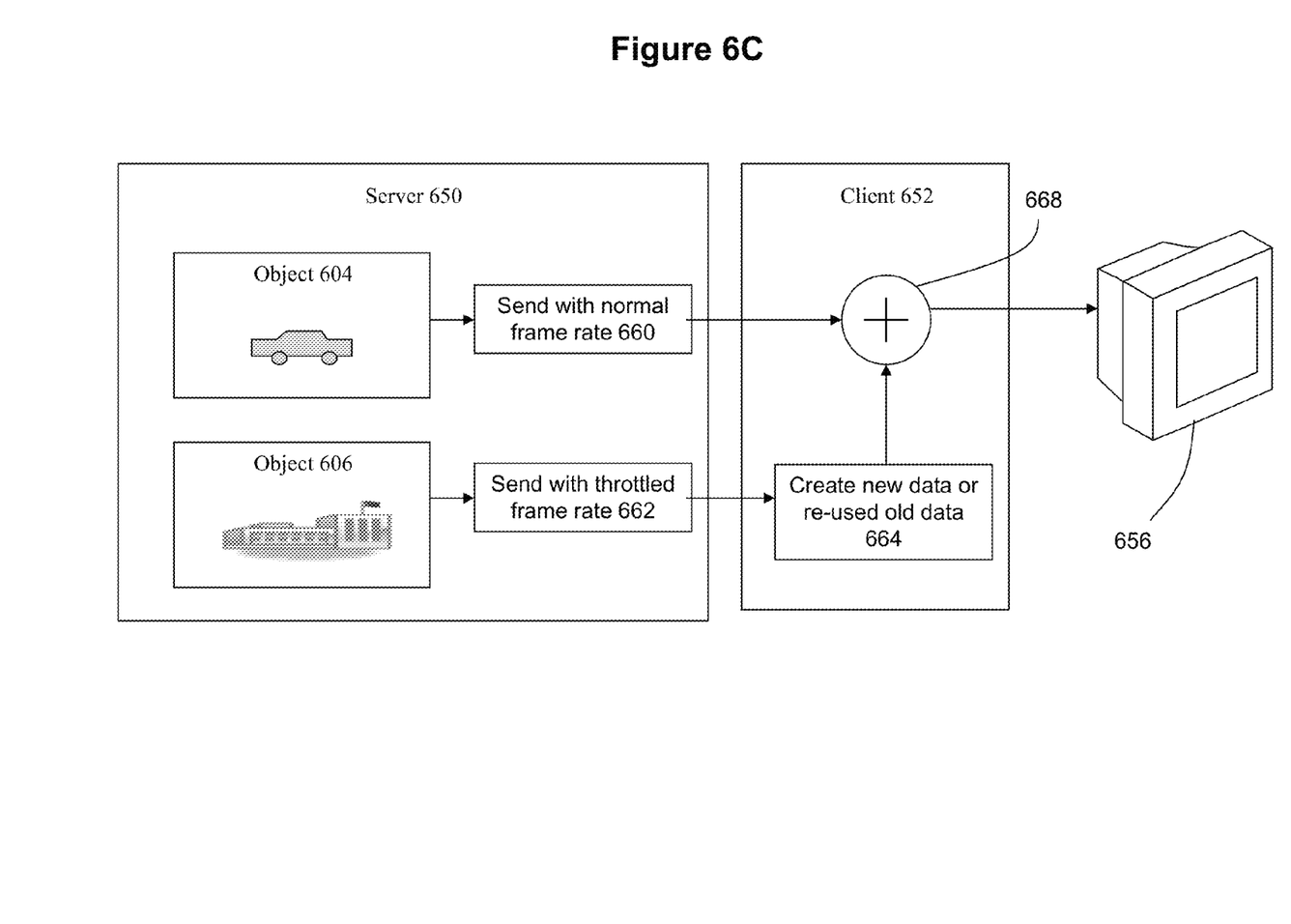

This approach is illustrated in FIGS. 6A-C. FIG. 6A shows an example frame 602 that include image objects 604 and 606. This figure shows the camera's point of view of frame 602 where object 604 (a car) and object 606 (a building) are both visible in the frame 602. It is assumed that frame 602 is generated by a server-based program, and therefore visual data for frame 602 is sent across a network for delivery to a client.

FIG. 6B shows an analysis process that can be used to determine how objects 604 and 606 should be categorized into the high and low bandwidth categories. Specifically, objects 604 and 606 are both analyzed in coordinate space relative to the location (point of view) of the camera 610 to identify the relative depth D1 for object 604 and depth D2 for object 606. Here, it can be seen that the depth D1 for object 604 is much smaller than the depth D2 for object 608. This comparison of the relative depths D1 and D2, where depth D2 for object 606 is much greater than depth D1 for object 604, indicates that object 604 corresponds to a foreground object and object 606 corresponds to a background object. This makes it likely that object 604, as a foreground object (i.e., a car), is likely to relate to an eye-sensitive object. On the other hand, object 606, as a background object (i.e., a background building), is likely to be less eye-sensitive.

Therefore, as shown in FIG. 6C, object 604 (foreground object) is associated with a high bandwidth delivery category and object 606 (background object) is associated with a low bandwidth delivery category. In particular, from the server 650, foreground object 604 is delivered with a normal frame rate 660 while background object 606 is delivered with a throttled frame rate 662.

At the client 652, the throttled frame rate data of the background object 606 is handled by either creating/extrapolating new frame data or by re-using existing frame data 664. The visual data for the background object 606 is combined with the visual data for the foreground object 604 at 668, and the final display data is presented to the user using display device 656.

Therefore, what has been described is a more efficient approach for delivering visual content from a server to a remote device. The approach of separating the visual data into multiple categories allows the data for the different categories to be delivered using different bandwidth utilizations schemes. This approach maintains the perceived quality level of the visual content that is delivered from the server, while also significantly decreasing the actual network delivery costs. The inventive approach of the invention can be utilized for efficiently delivering visual content for any type of computing application that provides visual content across a network.

System Architecture Overview

Figure 7:
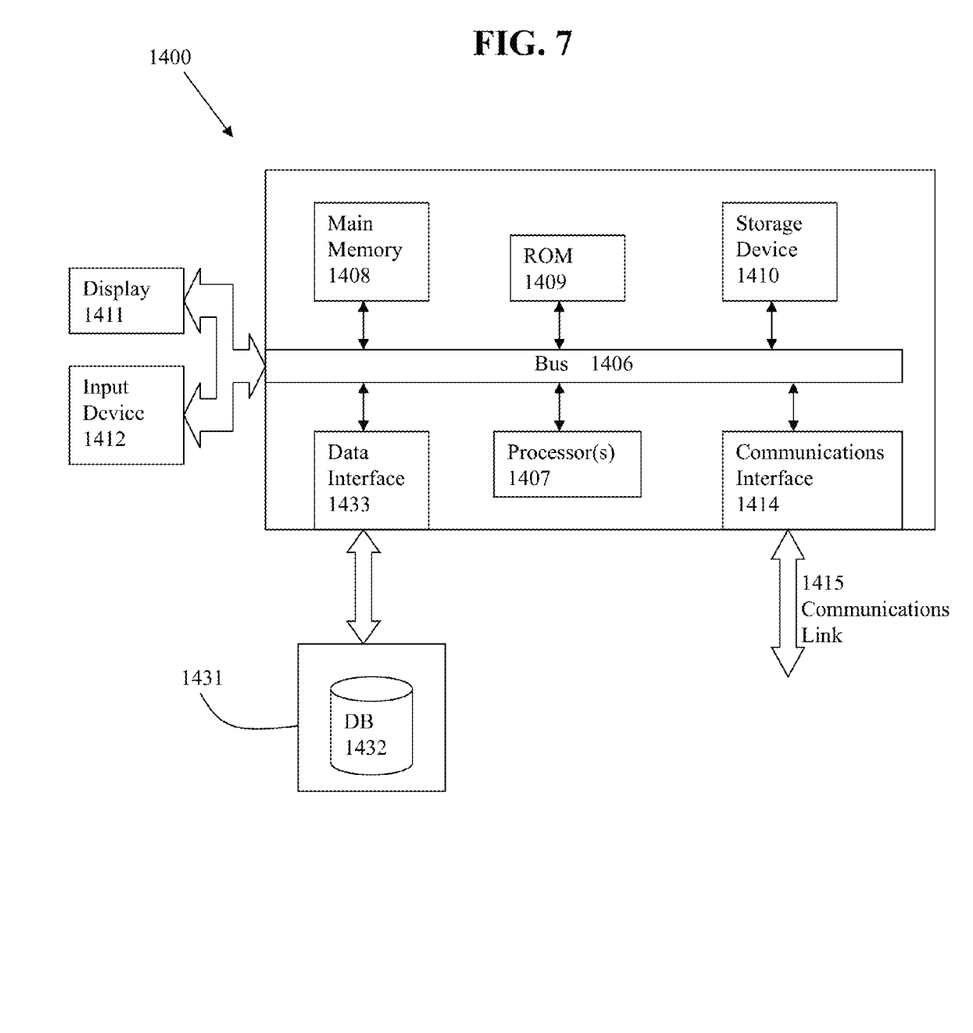
FIG. 7 depicts a computerized system on which an embodiment of the invention can be implemented.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for delivery of visual content across a network comprising:
   identifying coordinates for a foreground portion and a background portion of a frame of visual content;
   analyzing the coordinates of the foreground portion and the background portion of the frame of the visual content relative to a camera point of view;
   determining a relative depth of each of the foreground portion and the background portion of the frame of the visual content based on the analysis;
   categorizing the background portion of the frame of the visual content into a first bandwidth utilization category and the foreground portion of the frame into a second bandwidth utilization category based on the identifying, analyzing, and the determining, each of the first and second bandwidth utilization categories corresponds to a different delivery technique; and
   delivering the foreground portion and the background portion of the frame of the visual content across the network, each of the foreground portion and the background portion of the frame of the visual content is delivered according to the delivery technique corresponding to its associated bandwidth utilization category.

2. The method of claim 1, wherein the first bandwidth utilization category include a low bandwidth utilization category and the second bandwidth utilization category includes a high bandwidth utilization category.

3. The method of claim 1, wherein the foreground portion of the frame of the visual content is an object of the frame.

4. The method of claim 2, wherein the delivery technique associated with the low bandwidth utilization category corresponds to a frame rate throttling delivery technique.

5. The method of claim 2, wherein the delivery technique associated with the high bandwidth utilization category corresponds to a normal frame rate delivery technique.

6. The method of claim 4, wherein the frame rate throttling delivery technique includes extrapolating new frame data or re-using existing frame data.

7. A computer program product comprising a non-transitory computer readable medium, wherein the computer readable medium comprises executable program code for implementing a method for delivery of visual content across a network, the method comprising:
   identifying coordinates for a plurality of portions of a frame of visual content;
   analyzing the coordinates of the plurality of portions of the frame of the visual content relative to a camera point of view;
   determining a relative depth of each of the plurality of portions of the frame of the visual content based on the analysis;
   identify a first portion of the plurality of portions as a background portion and a second portion of the plurality of portions as a foreground portion based on the identifying the coordinates, the analyzing, and the determining;
   categorizing the background portion of the visual content into a first bandwidth utilization category and the foreground portion of the visual content into a second bandwidth utilization category, each of the first and second bandwidth utilization categories corresponds to a different delivery technique; and
   delivering the foreground portion and the background portion of the visual content across the network, the foreground portion and the background portion of the visual content is delivered according to the delivery technique corresponding to its associated bandwidth utilization category.

8. The computer program product of claim 7, wherein the first bandwidth utilization category includes a low bandwidth utilization category and the second bandwidth utilization category includes a high bandwidth utilization category.

9. The computer program product of claim 7, wherein the plurality of portions of the visual content are objects of the frame.

10. The computer program product of claim 8, wherein the delivery technique associated with the low bandwidth utilization category corresponds to a frame rate throttling delivery technique.

11. The computer program product of claim 8, wherein the delivery technique associated with the high bandwidth utilization category corresponds to a normal frame rate delivery technique.

12. The computer program product of claim 10, wherein the frame rate throttling delivery technique includes extrapolating new frame data or re-using existing frame data.

13. A system for delivery of visual content across a network, comprising:
   a memory that holds executable program code; and
   a processor capable of executing the executable program code, wherein the executable program code comprises code for:
      identifying coordinates for a plurality of portions of a frame of visual content;
      analyzing the coordinates of the plurality of portions of the frame of the visual content relative to a camera point of view;
      determining a relative depth of each of the plurality of portions of the frame of the visual content based on the analysis;
      identify a first portion of the plurality of portions as a background portion and a second portion of the plurality of portions as a foreground portion based on the identifying the coordinates, the analyzing, and the determining;

categorizing the background portion of the visual content into a first bandwidth utilization category and the foreground portion of the visual content into a second bandwidth utilization category, each of the first and second bandwidth utilization categories corresponds to a different delivery technique; and delivering the foreground portion and the background portion of the visual content across the network, the foreground portion and the background portion of the visual content is delivered according to the delivery technique corresponding to its associated bandwidth utilization category.

14. The system of claim 13, wherein the first bandwidth utilization category includes a low bandwidth utilization category and the second bandwidth utilization category includes a high bandwidth utilization category.

15. The system of claim 13, wherein the plurality of portions of the visual content are objects of the frame.

16. The system of claim 14, wherein the delivery technique associated with the low bandwidth utilization category corresponds to a frame rate throttling delivery technique.

17. The system of claim 14, wherein the delivery technique associated with the high bandwidth utilization category corresponds to a normal frame rate delivery technique.

18. The system of claim 16, wherein the frame rate throttling delivery technique includes extrapolating new frame data or re-using existing frame data.

* * * * *